United States Patent [19] [11] 4,254,012
Green [45] Mar. 3, 1981

[54] REINFORCED COMPOSITES CONTAINING CYANATO RESINS

[75] Inventor: George E. Green, Stapleford, England

[73] Assignee: Ciba-Geigy Corporation, Ardsley, N.Y.

[21] Appl. No.: 75,288

[22] Filed: Sep. 12, 1979

Related U.S. Application Data

[63] Continuation of Ser. No. 910,558, May 30, 1978, abandoned.

[30] Foreign Application Priority Data

Jun. 1, 1977 [GB] United Kingdom ............... 23175/77

[51] Int. Cl.$^3$ .............................................. C08K 7/14
[52] U.S. Cl. ............................ 260/42.18; 204/159.19
[58] Field of Search ............... 260/42.18, 901; 526/49; 528/205, 206, 422; 204/159.19

[56] References Cited

U.S. PATENT DOCUMENTS

| | | | |
|---|---|---|---|
| 3,935,330 | 1/1976 | Smith et al. | 204/159.19 |
| 3,943,103 | 3/1976 | Borden et al. | 260/901 |
| 3,962,184 | 6/1976 | Notomi et al. | 528/422 |
| 4,017,453 | 4/1977 | Heilman et al. | 260/42.18 |
| 4,025,407 | 5/1977 | Chang et al. | 204/159.19 |
| 4,031,067 | 6/1977 | Sunderman et al. | 260/77.5 |
| 4,059,567 | 11/1977 | Sunderman et al. | 260/47 |
| 4,066,577 | 1/1978 | Sunderman et al. | 260/2 |

FOREIGN PATENT DOCUMENTS

| | | |
|---|---|---|
| 844389 | 1/1977 | Belgium . |
| 844390 | 1/1977 | Belgium . |
| 1190184 | 4/1965 | Fed. Rep. of Germany . |
| 50-107500 | 8/1975 | Japan . |
| 1007790 | 10/1965 | United Kingdom . |

Primary Examiner—Lewis T. Jacobs
Attorney, Agent, or Firm—Harry Falber

[57] ABSTRACT

Fibrous-reinforced composites, such as prepregs and sheet moulding compounds, are made with a thermosettable cyanato resin, a photopolymerizable compound, and, if required, a heat-activated accelerator for heat-curing the resin. Fibers may be impregnated with a liquid mixture of the resin and the photopolymerizable compound, and irradiated to cause the mixture to solidify through photopolymerization. The product, when desired, e.g., after stacking to form a multilayer laminate, or after shaping, is heated to cure the resin. Alternatively, the liquid mixture is irradiated to form a solid film into which the fibers are pressed, and then, when required, the assembly is heated to cure the resin. The cyanato resins employed are of formula

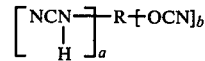

where R is an aliphatic, cycloaliphatic, or, preferably, an aromatic organic, group of not more than 18 carbon atoms, a is zero, or, if R is an aromatic group, may alternatively be an integer of 1 to 3, and b is an integer of 1 to 6 such that (a+b) is at least 2.

20 Claims, No Drawings

REINFORCED COMPOSITES CONTAINING CYANATO RESINS

This is a continuation of application Ser. No. 910,558, filed on May 30, 1978, now abandoned.

BACKGROUND OF THE INVENTION

This invention relates to reinforced composites containing photo-polymerised and thermosettable compositions and fibrous reinforcing materials, and to methods for their production.

Composite structures are commonly made by impregnating fibrous materials, such as fibers of paper, glass, aromatic polyamide, or carbon, metal filaments, and whiskers, usually in the form of layers, with a solution, in a volatile solvent, of a solid thermosettable resin and a heat-activated curing agent for the resin, causing the resin to solidify by evaporation of the solvent, and, when desired, curing the resin composition in the resultant so-called "prepreg" by the action of heat. Frequently, the prepegs are stacked before heat-curing, so that a multilayer laminate is formed.

Sheet moulding compounds are made by impregnating chopped fibrous reinforcement with a liquid thermosettable resin, and then causing the resin to thicken by chemical means such as by reaction of carboxyl groups in the resin with magnesium oxide. The resin is subsequently heat-cured.

Composite structures may also be prepared from films of a thermosettable resin composition by laying a film of the composition containing the resin and the curing agent on a fibrous reinforcement and applying heat and pressure so that the resin composition flows about the fibres but remains curable, and then heating further when desired so that the resin composition is cured by the heat-activated curing agent.

These methods suffer from certain drawbacks. Some thermosettable resin compositions are solid, and if a solvent is used to dissolve the components of the composition it is not always possible to eliminate all traces of it before the final curing takes place, and in consequence the cured composite may contain voids caused by evaporation of such residual solvent. Solvents may cause difficulties due to their toxicity or inflammability or to pollution. If a film adhesive is used, it is usually cast from a liquid thermosettable resin and this is then advanced to the solid state; such a process adds considerably to the cost of the composite. The methods also require a considerable expenditure of heat energy, either to evaporate the solvent or to advance the resin.

Recently, certain resins have become of considerable technical interest because the crosslinked polymers obtained therefrom have high glass transition temperatures. These resins, called herein "cyanato resins" for brevity, contain cyanate groups and undergo crosslinking by an addition polymerisation involving formation of sym-triazine structures.

DETAILED DISCLOSURE

We have now developed procedures whereby fibre-reinforced composites, containing a thermosettable resin composition as the matrix material, may be obtained using these valuable cyanato resins and without the need to incure the disadvantage just mentioned. In one procedure, the fibrous reinforcement is impregnated with the cyanato resin and with a liquid photopolymerisable compound, then the impregnated fibres are irradiated with actinic light such that the photopolymerisable compound solidifies, the cyanato resin, however, remaining thermosettable. In another procedure, a mixture of the cyanato resin and a liquid photopolymerisable compound is similarly irradiated, to form a film, and this is then used to impregnate the fibres.

It is not necessary to convert immediately the cyanato resin in the photopolymerised composition distributed on the fibres into the fully cured, insoluble, and infusible C-stage; often, it can be changed into the still fusible B-stage, or remain in the A-stage, and, when desired, e.g., after stacking, and/or after the composite has been formed into some desired configuration, fully cured by heating. For example, if a hollow shaped article is required, it is convenient to impregnate a continuous tow of fibrous reinforcement and wind the tow around a former while, at the same time, exposing the winding to actinic radiation. Such windings still have a certain degree of flexibility, permitting the former to be removed more easily than when a rigid winding is formed in one step. When required, the filament winding is heated to complete the cure.

Accordingly, this invention provides thermosettable composites comprising
(a) a fibrous reinforcing material,
(b) a cyanato resin, which may be used in the form of a prepolymer if wished, of the general formula

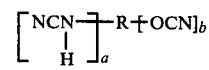

where
R is an aliphatic, cycloaliphatic, or, preferably, an aromatic, organic, group of not more than 18 carbon atoms,
a is zero, or, if R is an aromatic group, may alternatively be an integer of 1 to 3, and
b is an integer of 1 to 6 such that (a+b) is at least 2,
(c) a photopolymerized compound, and, if required,
(d) a heat-activated accelerator for heat-curing of the cyanato resin. Also included in this invention are a method of making a reinforced composite which comprises heat-curing a photopolymerised, but still thermosettable, composite of this invention, and heat-cured reinforced composites made thereby.

A convenient method of preparing the composites of this invention comprises (i) impregnating a fibrous reinforcing material
(a) with a liquid composition comprising
(b) a cyanato resin, as herein defined,
(c) a photopolymerisable compound (other than a cyanato resin), and, if required,
(d) a heat-activated accelerator for heat-curing of the cyanato resin, and/or
(e) a photopolymerisation catalyst for the compound (c), and (ii) in the absence of a substance which gives rise to a substantial degree of photoinduced polymerisation of the cyanato resin, exposing the impregnated material to actinic radiation such that the composition solidifies due to photopolymerisation of the photopolymerisable compound while the cyanato resin remains substantially in the thermosettable state.

This method is particularly useful for the production of filament windings and sheet moulding compounds.

Another method of preparing composites of this invention from fibrous reinforcing material (a) comprises (i) in the absence of a substance which gives rise to a substantial degree of photoinduced polymerisation of a cyanato resin (as herein defined), exposing to actinic radiation a layer of a liquid composition comprising (b) a cyanato resin, (c) a photopolymerisable compound, other than a cyanato resin, and, if required, (d) a heat-activated accelerator for heat-curing of the cyanato resin, and/or (e) a photopolymerisation catalyst for the compound (c), until the said composition solidifies to form an essentially solid continuous film due to photopolymerisation of the photopolymerisable compound while the cyanato resin remains substantially in the thermosettable state, and (ii) bringing together the film so formed and the fibrous reinforcing material (a) under conditions such that the said film flows about the fibres and the components of the film and the fibres form a coherent structure but the cyanato resin remains substantially thermosettable.

Usually, the film and fibrous reinforcing material are brought together with the application of heat and/or pressure. The period of heating can be very short, as there need be no solvent to evaporate and the film need not be thick.

The latter procedure is particularly convenient when unidirectional fibrous reinforcement is to be used for making prepregs, especially if the fibres are short and/or light, because there is less tendency for the fibres to become displaced and the reinforcing effect thereby become irregularly distributed.

That a cyanato resin could be subsequently heat-cured after the photopolymerisable compound has been photopolymerised was unexpected, because, according to German Auslegeschrift No. 1190184, cyanato resins can be polymerized by exposure to light.

In formula I, R preferably denotes the residue, after removal of all the phenolic hydroxyl groups, of a phenol of formula

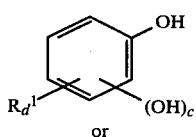

or

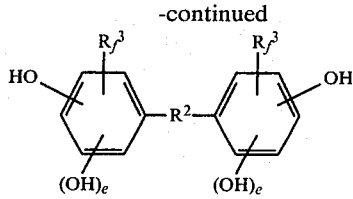

where $R^1$ is a hydrogen or a halogen atom, an alkyl or alkoxy group of 1 to 4 carbon atoms, or a phenyl group, or two $R^1$ groups may, together with the indicated benzene ring, form a naphthalene ring, $R^2$ is a carbon-carbon bond, an alkylene group of 1 to 5 carbon atoms, an oxygen or sulphur atom, or a carbonyl or sulphonyl group, $R^3$ has the same meaning as $R^1$ but may also denote a group of formula

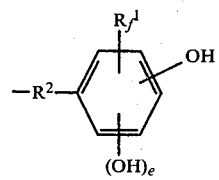

$c$ is an integer of value (5-d),
$d$ is an integer of value 1 to 3,
$e$ is an integer of value (4-f), and
$f$ is an integer of value 1 or 2.

Specific examples of cyanato resins are m- and p-dicyanatobenzene, 1,3,5-tricyanatobenzene, 1,3-, 1,4-, 1,5-, 1,6-, 1,7-, 1,8-, 2,6-, and 2,7-dicyanatonaphthalene, 1,3,6-tricyanatonaphthalene, 4,4'-dicyanatodiphenyl, 2,2'-dicyanato-1,1'-dinaphthyl, 2,5-dicyanatotoluene, 2-chloro-1,4-dicyanatobenzene, 2,4-dicyanatoacetophenone, 2-nitro-1,3-dicyanatobenzene, bis(4-cyanatophenyl)methane, bis(4-cyanatophenyl) ether, 4,4'-dicyanatobenzophenone, and especially 2,2-bis(4-cyanatophenyl)propane, and their prepolymers. Cyanato resins, their formation from a hydroxyl compound (including an aminophenol or an aminoalkylphenol) and a cyanogen halide in the presence of a base, and their trimerisation are described in British Specification No. 1007790, German Auslegeschrift No. 1190184, and Belgian Patent Specifications Nos. 844387, 844389, and 844390.

Crosslinked triazine ring-containing polymers are formed by heating these cyanato resins; thus, in the case of a dicyanate, crosslinking is presumed to proceed as follows:

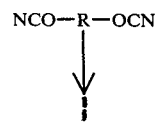

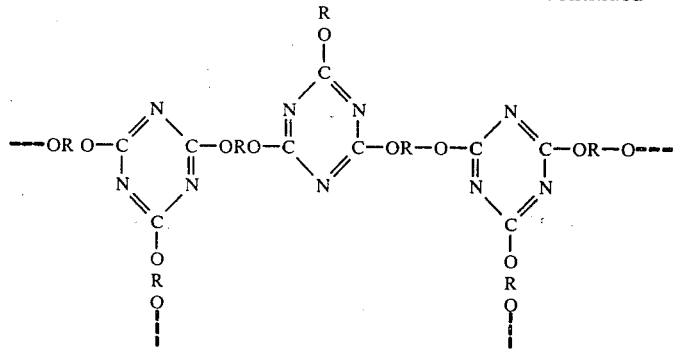

Compositions used to prepare the thermosettable composites of the present invention must be liquid under the conditions used in making the films or in impregnating the reinforcing material before irradiation but are preferably solvent-free.

The reinforcement may be in the form of woven or non-woven cloth, unidirectional lengths, or chopped strands, and may be of natural or synthetic fibres, including strands and filaments, especially of glass, boron, stainless steel, tungsten, alumina, silicon carbide, asbestos, an aromatic polyamide such as poly(m-phenylene isophthalamide) or poly(p-phenylene terephthalamide), or carbon, and whiskers of, e.g., potassium titanate.

The photopolymerisable compound used in processes of the present invention may be of any chemical type known to polymerise under the influence of actinic radiation. Such materials are described in, for example, Kosar, "Light-sensitive Systems: Chemistry and Applications of Non-Silver Halide Photographic Processes", Wiley, New York, 1965. As is well known, these materials fall into two main classes (i) those which are polymerised through a free-radical chain reaction (photoinitiated polymerisation) and (ii) those in which polymerisation is effected by reaction of an excited molecule of the monomer with an unexcited molecule of the monomer.

The first type require only one photopolymerisable group per molecule to form long chains on polymerisation while the second type must have at least two photopolymerisable groups per molecule, since if they have only one such group per molecule they will dimerise, but not polymerise, on irradiation.

Photopolymerisable substances of the first type preferred for use in this invention have one ethylenic linkage, or more than one providing they are unconjugated. Preferred examples of these substances are arcylic esters containing at least one group of the general formula VII, VIII, or IX $$CH_2=C(R^4)COO- \quad \text{VII}$$
$$[CH_2=C(R^4)CONH]_2CHCOO- \quad \text{VIII}$$
$$CH_2=C(R^4)CONHCH(OH)CH_2COO- \quad \text{IX}$$

where $R^4$ is a hydrogen, chlorine, or bromine atom, or an alkyl hydrocarbon group of 1 to 4 carbon atoms, especially a hydrogen atom or a methyl group. More specific examples of preferred acrylates are neopentyl glycol diacrylate and those given below under formulae XXII, XXIII, and XXV to XXVII. Other examples of substances of this type are styrene and crotonic acid.

Photopolymerisable materials of the second type include those having at least two, and preferably three or more, groups which are azido, coumarin, stilbene, disubstituted maleimide, pyridinone, chalcone, propenone, or pentadienone groups, or acrylic acid groups which are substituted in their 3- position by groups having ethylenic unsaturation or aromaticity in conjugation with the ethylenic double bond of the acrylic group.

Examples of suitable azides are those containing at least two groups of the formula $$N_3-R^5- \quad \text{X}$$

or $$N_3-SO_2-R^5- \quad \text{XI}$$

where $R^5$ denotes a mononuclear or dinuclear divalent aromatic radical containing from 6 to at most 12 carbon atoms, especially a phenylene or naphthylene group.

Examples of suitable coumarins are those containing groups of the formula

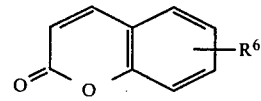

where $R^6$ is an oxygen atom, a carbonyloxy group (—COO—), a sulphonyl group, or a sulphonyloxy group.

Examples of photopolymerisable materials containing stilbene groups are those having groups of the formula

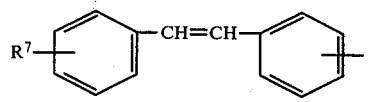

where $R^7$ is the residue, containing up to 8 carbon atoms in all, of a five or six-membered nitrogen-containing heterocyclic ring, fused to a benzene or naphthalene nucleus, and linked through a carbon atom of the said heterocyclic ring adjacent to a nitrogen hetero atom thereof to the indicated benzene nucleus, such as a benzimidazolyl, benzoxazolyl, benzotriazolyl, benzothiazolyl, or a naphthotriazolyl residue.

Examples of photopolymerisable substances containing disubstituted maleimide units are those having groups of the formula

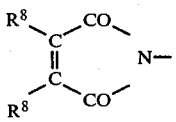 XIV directly attached to carbon atoms, where each $R^8$ is an alkyl group of 1 to 4 carbon atoms, a chlorine atom, or a phenyl group, especially a methyl group.

Examples of photopolymerisable substances containing pyridinone units are those having, directly attached to carbon atoms, groups of the formula

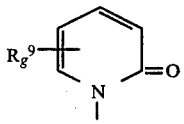 XV where $R^9$ is an aliphatic or cycloaliphatic radical of 1 to 8 carbon atoms and g is zero or an integer of 1 to 4.

Examples of compounds containing chalcone, propenone, or pentadienone groups are those containing structures of formula

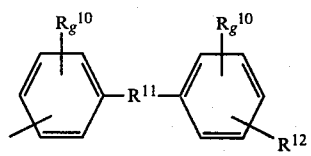 XVI or

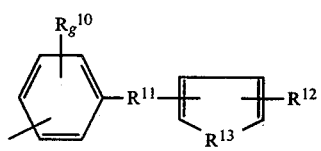 XVII where each $R^{10}$ is a halogen atom, or an alkyl, cycloalkyl, alkenyl, cycloalkenyl, alkoxy, cycloalkoxy, alkenoxy, cycloalkenoxy, carbalkoxy, carbocycloalkoxy, carbalkenoxy, or carbocycloalkenoxy group, such organic groups containing 1 to 9 carbon atoms, or a nitro group, or a carboxyl, sulphonic, or phosphoric acid group in the form of a salt, g has the meaning previously assigned, $R^{11}$ represents a grouping of formula

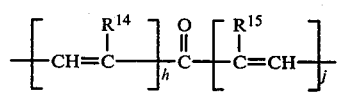 XVIII or

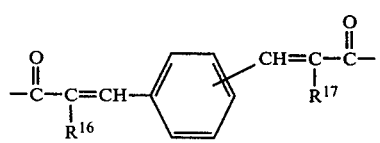 XIX or

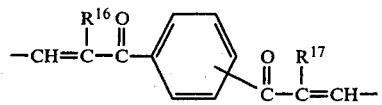 XX where $R^{14}$ and $R^{15}$ are each individually a hydrogen atom, an alkyl group, e.g., of 1 to 4 carbon atoms, or an aryl group, e.g., of up to 12 carbon atoms, preferably a mononuclear group such as a phenyl group, or conjointly denote a polymethylene chain of 2 to 4 methylene groups, $R^{16}$ and $R^{17}$ are each a hydrogen atom, an alkyl group, e.g., of 1 to 4 carbon atoms, or an aryl group, e.g., of up to 12 carbon atoms, preferably a mononculear group such as a phenyl group, h and j are each zero, 1, or 2, with the proviso that they are not both zero, $R^{12}$ represents a valency bond or a hydrogen atom, and $R^{13}$ represents an oxygen or sulphur atom.

Suitable 3- substituted acrylates contain groups of the general formula $$R^{18}CH=C(R^4)COO— \qquad XXI$$

where $R^{18}$ is an aliphatic or mononuclear aromatic, araliphatic, or heterocyclyl group, preferably of not more than 12 carbon atoms, which, as already indicated, has ethylenic unsaturation or aromaticity in conjugation with the ethylenic double bond shown, such as a phenyl, 2-furyl, 2- or 3-pyridyl, prop-2-enyl, or styryl group, and $R^4$ has the meaning previously assigned.

Specific examples are disorbates and bis(2-furylacrylates) of poly(oxyethylene) glycols and poly(oxypropylene) glycols.

If desired, a mixture of photopolymerisable compounds may be used.

Especially preferred photopolymerisable compounds used in processes of this invention are neopentyl glycol diacrylate and esters of acrylic acid which are of any of the following general formulae XXII, XXIII, and XXV to XXVII.

Formula XXII is

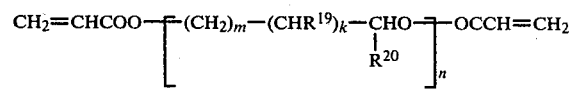

where k is zero or 1, m is an integer of 1 to 8, n is an integer of 1 to 20, $R^{19}$ denotes —H, —OH, or —OOCCH=$CH_2$, and $R^{20}$ denotes —H, —$CH_3$, —$C_2H_5$, —$CH_2OH$, or —$CH_2OOCCH=CH_2$.

Examples of compounds of formula XXII are triethylene glycol diacrylate and tetraethylene glycol diacrylate.

Formula XXIII is

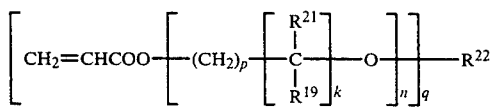

where k, n, and $R^{19}$ have the meanings assigned above, p is zero or a positive integer, preferably of not more than 8, provided that k and p are not both zero, q is an integer of from 1 to 4, $R^{21}$ denotes —H, —Cl, —CH$_3$, or —C$_2$H$_5$, and $R^{22}$ denotes an organic radical of valency q, linked through a carbon atom or carbon atoms thereof to the indicated q terminal oxygen atoms, preferably the hydrocarbon residue of an aliphatic alcohol containing from 1 to 6 carbon atoms, such as —CH$_3$ or

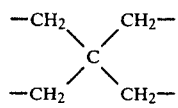 XXIV

A specific example of a compound of formula XXIII is 2-methoxyethyl acrylate.

Formula XXV is

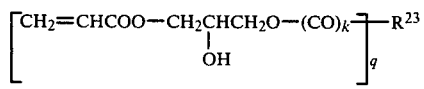

where k and q have the meanings previously assigned and $R^{23}$ denotes an organic radical of valency q, linked through a carbon atom thereof, other than the carbon atom of a carbonyl group.

More particularly, when k is zero, $R^{23}$ may denote the residue, containing from 1 to 18 carbon atoms, of an alcohol or phenol having q hydroxyl groups.

$R^{23}$ may thus represent, for example an aromatic group (which may be substituted in the ring by alkyl groups), an araliphatic, cycloaliphatic, heterocyclic, or heterocycloaliphatic group, such as an aromatic group containing only one benzene ring, optionally substituted by chlorine or by alkyl groups each of from 1 to 9 carbon atoms, or an aromatic group comprising a chain of two benzene rings, optionally interrupted by ether oxygen atoms, aliphatic hydrocarbon groups of 1 to 4 carbon atoms, or sulphone groups, each benzene ring being optionally substituted by chlorine or by alkyl groups each of from 1 to 6 carbon atoms, or, preferably, a saturated or unsaturated, straight or branched-chain aliphatic group, which may contain ether oxygen linkages and which may be substituted by hydroxyl groups, especially a saturated or monoethylenically-unsaturated straight chain aliphatic hydrocarbon group of from 1 to 8 carbon atoms.

Specific examples of such groups are the aromatic groups of the formulae —C$_6$H$_5$ and —C$_6$H$_4$CH$_3$, in which case q is 1, —C$_6$H$_4$C(CH$_3$)$_2$ C$_6$H$_4$— and —C$_6$H$_4$CH$_2$C$_6$H$_4$—, in which case q is 2, and —C$_6$H$_4$(CH$_2$C$_6$H$_3$—)$_r$CH$_2$C$_6$H$_4$—, where r is 1 or 2, in which case q is 3 or 4, and the aliphatic groups of formula

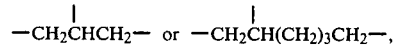

in which case q is 3, or —(CH$_2$)$_4$—, —CH$_2$CH=CHCH$_2$—, —CH$_2$CH$_2$OCH$_2$CH$_2$—, or —(CH$_2$OCH$_2$O)$_2$CH$_2$CH$_2$—, in which case q is 2, or —(CH$_2$)$_3$CH$_3$, —(CH$_2$)$_4$OH, —CH$_2$CH=CH$_2$, —(CH$_2$)$_2$OH, —CH$_2$CH(CH$_3$)OH, or —CH$_2$CH=CHCH$_2$OH, in which case q is 1.

When k is 1, $R^{23}$ may represent the residue, containing from 1 to 60 carbon atoms, of an acid having h carboxyl groups, preferably a saturated or ethylenically-unsaturated straight chain or branched aliphatic hydrocarbon group of from 1 to 20 carbon atoms, which may be substituted by chlorine atoms and which may be interrupted by ether oxygen atoms and/or carbonyloxy groups, or a saturated or ethylenically-unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms, which may be substituted by chlorine atoms.

Further preferred are such compounds in which $R^{23}$ represents a saturated or ethylenically-unsaturated straight chain or branched aliphatic hydrocarbon group of from 1 to 8 carbon atoms, optionally substituted by a hydroxyl group, or a saturated or ethylenically-unsaturated straight chain or branched aliphatic hydrocarbon group of from 4 to 50 carbon atoms and interrupted in the chain by carbonyloxy groups, or a saturated or ethylenically-unsaturated monocyclic or dicyclic cycloaliphatic hydrocarbon group of 6 to 8 carbon atoms, or an ethylenically-unsaturated cycloaliphatic-aliphatic hydrocarbon group of from 10 to 51 carbon atoms, or a mononuclear aromatic hydrocarbon group of from 6 to 8 carbon atoms.

Specific examples of these residues of carboxylic acids are those of the formula —CH$_3$, —CH$_2$CH$_3$, —CH$_2$CH(OH)CH$_3$, —CH$_2$Cl, and —C$_6$H$_5$, in which case q is 1, and —CH$_2$CH$_2$—, —CH=CH—, and —C$_6$H$_4$—, in which case q is 2.

Specific examples of suitable compounds of formula XXV are 1,4-bis(2-hydroxy-3-(acryloxy)propoxy)butane, a poly(2-hydroxy-3-(acryloxy)propyl) ether of a phenol-formaldehyde novolak, 2-(2-hydroxy-3-(acryloxy)propoxy)-butane, -n-octane, and -n-decane, bis(2-hydroxy-3-(acryloxy)propyl) adipate, 2-hydroxy-3-(acryloxy)propyl propionate, and 3-phenoxy-2-hydroxypropyl acrylate.

Formula XXVI is

where $R^{24}$ denotes CH$_3$—, C$_2$H$_5$—, or CH$_2$=CHCOOCH$_2$—.

Examples of such acrylates are pentaerythritol tetraacrylate and 1,1,1-trimethylolpropane triacrylate.

Formula XXVII is

where $R^{25}$ denotes either an alkyl group of 1 to 6 carbon atoms, optionally substituted by one hydroxyl group, such as an ethyl, n-propyl, n-butyl, 2-hydroxyethyl, or 2-hydroxypropyl group, or a dialkylaminoalkyl group containing in all 3 to 12 carbon atoms, such as a diethylaminoethyl group.

The molar ratio of the cyanato resin to photopolymerisable compound is such that there is sufficient of each present to form both a satisfactory heat-curable composite and a satisfactorily heat-cured composite. Usually the molar ratio is from 10:1 to 1:10, and especially from 5:1 to 1:5.

Preferably the photopolymerisable compound is irradiated in the presence of a photopolymerisation catalyst. Suitable catalysts are well known and are described in, for example, the book by Kosar cited above.

Like the photopolymerisable compounds, the catalysts fall into two main classes (a) those which, on irradiation, give an excited state that leads to formation of free radicals which then initiate polymerisation of the monomer (photoinitiators) and (b) those which, on irradiation, give an excited state which in turn transfers its excitation energy to a molecule of the monomer, giving rise to an excited molecule of the monomer which then crosslinks with an unexcited molecule of the monomer (photosensitisers).

The first class includes organic peroxides and hydroperoxides, α-halogen substituted acetophenones such as trichloromethyl 4'-tert.butyl-phenyl ketone, benzoin and its alkyl ethers, e.g., the n-butyl ether, α-methylbenzoin, benzophenones, O-alkoxycarbonyl derivatives of an oxime of benzil or of 1-phenylpropane-1,2-dione, such as benzil (O-ethoxycarbonyl)-α-monoxime and 1-phenylpropane-1,2-dione-2-(O-ethoxycarbonyl)oxime, benzil acetals e.g., its dimethyl acetal, substituted thioxanthones, e.g., 2-chlorothioxanthone, anthraquinones, and mixtures of phenothiazine dyes (e.g., methylene blue) or quinoxalines (e.g., metal salts of 2-(m- or p-methoxyphenyl)quinoxaline-6'- or 7'-sulphonic acids) with electron donors such as benzenesulphinic acid, toluenesulphinic acid, or other sulphinic acid or a salt thereof such as the sodium salt, an arsine, a phosphine, or thiourea (photoredox systems), these initiators being used with unsaturated esters, especially acrylates and methacrylates and also acrylamides.

The second class includes 5-nitroacenaphthene, 4-nitroaniline, 2,4,7-trinitro-9-fluorenone, 3-methyl-1,3-diaza-1,9-benzanthrone, and bis(dialkylamino)benzophenones, especially Michler's ketone, i.e., bis(p-dimethylamino)benzophenone.

Suitable photopolymerisation catalysts are readily found by routine experimentation. The catalysts must not, of course, give rise to a substantial degree of photo-induced polymerisation of the cyanato resin, neither should any other substance present: further, they must not cause curing of the cyanato resin under the conditions of photopolymerisation such that that resin does not remain substantially thermosettable.

Generally, 0.1 to 20%, and preferably 0.5 to 10%, by weight of the photopolymerisation catalyst is incorporated, based on the weight of the photopolymerisable compound.

In the photopolymerising step actinic radiation of wavelength 200–600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of the photopolymerisable compound will depend upon a variety of factors which include, for example, the individual compound used, the amount of that compound on the reinforcement, the type of light source, and its distance from the impregnated material. Suitable times may be readily determined by those familiar with photopolymerisation techniques, but in all cases the product after photopolymerisation must still be curable by heating: for this reason, photopolymerisation is carried out at temperatures below those where curing of the cyanato resin by the heat-activated curing agent becomes substantial.

The temperatures and duration of heating required for the thermal curing are readily found by routine experimentation and easily derivable from what is readily well known concerning the heat-curing of cyanato resins.

If desired, part, typically 30 to 70 mol-%, of the cyanato resin, when R denotes an aromatic group, may be replaced by a cyanamide of formula $$R^{26}(NHCN)_t \qquad \text{XXVIII}$$

where $R^{26}$ is an aliphatic, cycloaliphatic, heterocyclic, or aromatic radical and t is an integer of from 2 to 5.

The formation of N-cyano-isourea-ether prepolymers by heating a mixture of a compound of formula I and a compound of formula XXVIII, and subsequent further heating to form the crosslinked polytriazine, is described in Belgian Pat. No. 844 386.

Alternatively, if desired, part of the cyanato resin, when R denotes an aromatic group, may be replaced by an N-cyanosulphonamide of formula $$R^{27}(SO_2NHCN)_t \qquad \text{XXIX}$$

where $R^{27}$ is an aliphatic, cycloaliphatic, or aromatic radical and t has the meaning previously assigned.

Typically, 30 to 70 mol-% of the cyanato resin may be replaced by a compound of formula XXIX.

The formation of prepolymers by heating a mixture of a compound of formula I and a compound of formula XXIX, and subsequent further heating to form a crosslinkd polytriazine, is described in Belgian Pat. No. 844 391.

If a heat-curing catalyst for the cyanato resin is employed, this is usually dissolved or suspended in the liquid composition before impregnation of the reinforcement. Suitable catalysts for the heat-induced trimerisation are listed in German Auslegeschrift No. 1 190 184, and include Lewis acids such as aluminium trichloride, proton acids such as hydrochloric acid, bases such as trimethylamine, and phosphorus-containing compounds such as tributylphosphine, Zinc octanoate is also useful.

The cyanato resin, the photopolymerisable compound, and, if used, the heat-curing catalyst, and the catalyst for the photopolymerisation, are preferably applied so that the heat-curable composite contains a total of from 20 to 80% by weight of the said components and, correspondingly, 80 to 20% by weight of the reinforcement. More preferably, a total of 30 to 50% by weight of these components and 70 to 50% by weight of the reinforcement are employed.

As already indicated, when the cyanato resin and the photopolymerisable compound are applied as a film, the components are caused to flow about the fibrous material by applying heat and/or pressure. Of course, heating must not be to an extent that the prepreg becomes substantially heat-cured. Heated platens or pairs of rollers may be used, for example, and in the latter case, when unidirectional fibres are used, a rolling pressure may be applied in the direction of the fibre alignment. In place of pairs of rollers, the assembly may be passed under tension around part of the periphery of a single roller.

The film may be provided with a strippable backing sheet, e.g., of a polyolefin or a polyester, or of cellulosic paper having a coating of a silicone release agent, on the face opposite to that brought into contact with the fibrous reinforcement. Manipulation of the assembly is often easier if the film has a tacky surface. This may be produced by coating the film with a substance which is tacky at room temperature but which cures to a hard, insoluble, infusible resin under the conditions of heat employed to cure the cyanato resin component of the film. However, an adequate degree of tackiness often exists without additional treatment.

Prepregs may be made by a batch process, the fibrous reinforcing material being laid on the film of the photopolymerised composition, which is advantageously under slight tension, when a second such film may, if desired, be laid on top and then the assembly is pressed while being heated.

Prepregs may also be made continuously, such as by contacting the fibrous reinforcing material with the film of the photopolymerised composition, if desired, placing a second such film on the reverse face of the fibrous reinforcing material, and then applying heat and pressure. More conveniently, two such films, preferably supported on the reverse side by belts or strippable sheets, are applied simultaneously to the fibrous reinforcing material so as to contact each exposed face. When two such films are applied, they may be the same or different.

Multilayer prepregs may be made by heating under pressure interleaved films and layers of one or more fibrous materials. When unidirectional fibres are the reinforcement material, successive layers of them may be oriented to form cross-ply prepregs. With the fibrous reinforcing material there may be used additional types of reinforcement, such as a foil of a metal (e.g., aluminium, steel, or titanium), or a sheet of a plastics material (e.g., an aromatic or aliphatic polyamide, a polyimide, a polysulphone, or a polycarbonate) or of a rubber (e.g., a neoprene or acrylonitrile rubber).

In the production of sheet moulding compositions a mixture of the cyanato resin, the photopolymerisable compound, and, if used, the heat-activated accelerator for heat-curing of the cyanato resin and the catalyst for photopolymerisation, together with the chopped strand reinforcing material and any other components, are exposed to irradiation in layers through supporting sheets.

The following Examples illustrate the invention. Temperatures are in degrees Celsius and, unless otherwise indicated, parts are by weight. Epoxide contents were determined by titration against a 0.1 N solution of perchloric acid in glacial acetic acid in the presence of excess of tetraethylammonium bromide, crystal violet being used as the indicator. Flexural strengths are the mean of three results and were determined according to British Standard Specification 2782, Method 304B. Interlaminar shear strengths are likewise the mean of three results; they were determined according to ASTM method D 2344-72.

Materials used in the Examples were prepared as follows:

ACRYLATE A

This, which is substantially 1-phenoxy-2-hydroxypropyl acrylate, was prepared in the following manner.

To 500 g of phenyl glycidyl ether of epoxide content 6.16 equiv./kg containing tetramethylammonium chloride (1.5 g) and 2,6-di-tert.butyl-p-cresol (1 g) at 100° was added with stirring over 1 hour 222 g of acrylic acid. The mixture was stirred for a further 4 hours at 100°, by which time its epoxide content had fallen to 0.92 equiv./kg., affording the desired acrylate.

SORBATE A

To a stirred solution of 100 g of poly(oxyethylene)-glycol (having an average molecular weight of 200), 110 g of triethylamine, and 500 ml of toluene at room temperature was added 130.5 g of sorboyl chloride over 30 minutes. The mixture was then stirred at 80° C. for 1 hour, cooled and filtered. Removal of the solvent under reduced pressure gave the desired poly(oxyethylene) disorbate.

EXAMPLE I

The cyanato resin employed was a prepolymer, having an average molecular weight of 2000, of 2,2-bis(4-cyanatophenyl)propane, obtained commercially as a 70% solution in butanone.

First, the butanone was distilled off under reduced pressure, leaving the prepolymer which has a softening point of about 50° to 60° C. A portion (70 parts) of the solid residue was dissolved in 30 parts of Acrylate A containing 0.3 part of zinc octanoate and 1 part of benzil dimethyl acetal.

Glasscloth was impregnated with this composition and exposed on both sides for 10 seconds to irradiation from high pressure metal halide-quartz lamps. From this prepreg, a six-ply laminate was made using pieces 15 cm×15 cm, and pressing at 1.4 MN/m$^2$ for 1 hour at 120° followed by 1 hour at 140°. The laminate, which comprised 46% of glass, had a flexural strength of 166 MN/m$^2$ and an interlaminar shear strength of 13.3 MN/m$^2$.

EXAMPLE II

A further portion (35 parts) of the solid cyanato resin obtained in Example I was dissolved in 15 parts of neopentyl glycol diacrylate containing 0.15 part of zinc octanoate and 0.6 part of benzil dimethyl acetal. A six-ply laminate was made from this composition by the procedure described in Example I except that it was heated for 1 hour at 120° and then 2 hours at 180°. The flexural strength of the laminate, which comprised 68.4% of glass, was 285 MN/m$^2$.

EXAMPLE III

A portion (70 parts) of the solid cyanato resin obtained in Example I was dissolved in 30 parts of Sorbate A containing 0.3 part of zinc octanoate and 2 parts of bis(p-dimethylamino)benzophenone, and this composition was used to impregnate a cloth of poly(p-phenylenediamine terephthalamide) fibres. The prepreg, obtained by irradiation for 2 minutes to the same lamps as used in the preceding Examples, was cut into 10 cm squares, and from these a four-ply laminate was made, pressing at 1.4 MN/m² at 170° for 1 hour. The laminate, consisting of 56% of the polyaromatic amide fibres, had a flexural strength of 711 MN/m².

EXAMPLE IV

A coating, 36 μm thick, of a liquid mixture comprising 70 parts of the solid cyanato resin obtained in Example I, 30 parts of Acrylate A, 0.3 part of zinc octanoate, and 1 part of benzil dimethyl acetal, was applied to siliconised paper, and it was irradiated for 30 seconds under a high pressure metal halide-quartz lamp to afford a film.

This film was laid onto both faces of a web of carbon fibres (13.4 tows per cm., the weight of a tow being 0.2 g/m), and pressed at 100° for 1 minute under 0.34 MN/m².

A 5-layer crossply laminate was made from this prepreg, using pieces 8 cm×8 cm, the assembly being pressed at 120° for 1 hour under 1.4 MN/m² and then heated for 1 hour further at 170°. The flexural strength of the laminate, which comprised 55.5% of carbon fibres, was 140 MN/m².

What is claimed is:

1. Thermosettable composites consisting of
   (a) a fibrous reinforcing material,
   (b) a cyanato resin of the general formula

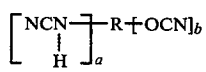

where
   R is an aliphatic, cycloaliphatic, or an aromatic organic group of not more than 18 carbon atoms,
   a is zero, or, if R is an aromatic group, may alternatively be an integer of 1 to 3, and
   b is an integer of 1 to 6 such that (a+b) is at least 2, and
   (c) a photopolymerised compound.

2. The composites of claim 1, which also contain (d), a heat-activated accelerator for heat-curing of the cyanato resin.

3. The composites of claim 1, in which the cyanato resin (b) is a prepolymer.

4. The composites of claim 1, in which R denotes the residue, after removal of all the phenolic hydroxyl groups, of a phenol of formula

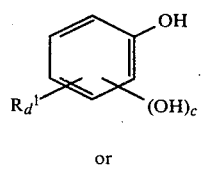

or

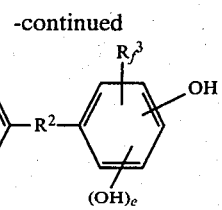

where
   $R^1$ is a hydrogen or a halogen atom, an alkyl or alkoxy group of 1 to 4 carbon atoms, or a phenyl group, or two $R^1$ groups may, together with the indicated benzene ring, form a naphthalene ring,
   $R^2$ is a carbon-carbon bond, an alkylene group of 1 to 5 carbon atoms, an oxygen or sulfur atom, or a carbonyl or sulfonyl group,
   $R^3$ is a hydrogen or halogen atom, an alkyl or alkoxy group of 1 to 4 carbon atoms, a phenyl group, or a group of formula

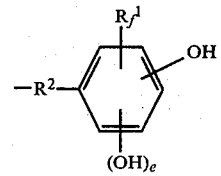

c is an integer of value (5−d),
   d is an integer of value 1 to 3,
   e is an integer of value (4−f), and
   f is an integer of value 1 or 2.

5. The composites of claim 1, in which the cyanato resin is m- or p-dicyanatobenzene, 1,3,5-tricyanatobenzene, 1,3-, 1,4-, 1,5-, 1,6-, 1,7-, 1,8-, 2,6-, or 2,7-dicyanatonaphthalene, 1,3,6-tricyanatonaphthalene, 4,4'-dicyanatodiphenyl, 2,2'-dicyanato-1,1'-dinaphthyl, 2,5-dicyanatoluene, 2-chloro-1,4-dicyanatobenzene, 2,4-dicyanatoacetophenone, 2-nitro-1,3-dicyanatobenzene, bis(4-cyanatophenyl)methane, bis(4-cyanatophenyl) ether, 4,4'-dicyanatobenzophenone, or 2,2-bis(4-cyanatophenyl)propane, or a prepolymer of any of these.

6. The composites of claim 1, in which R denotes an aromatic group and part of the cyanato resin is replaced by a cyanamide of formula $$R^{26}(NHCN)_t \qquad\qquad XXVIII$$

where
   $R^{26}$ is an aliphatic, cycloaliphatic, heterocyclic, or aromatic organic radical and
   t is an integer of from 2 to 5.

7. The composites of claim 1, in which R denotes an aromatic group and part of the cyanato resin is replaced by an N-cyanosulphonamide of formula $$R^{27}(SO_2NHCN)_t \qquad\qquad XXIX$$

where
   $R^{27}$ denotes an aliphatic, cycloaliphatic, or aromatic organic radical and
   t is an integer of from 2 to 5.

8. The composites of claim 1, in which the component (c) has been photopolymerised through a free-radical chain reaction.

9. The composites of claim 1, in which the component (c) has been produced by photopolymerisation of a compound having one carbon-carbon ethylenic linkage, or more than one carbon-carbon ethylenic linkage provided they are conjugated.

10. The composites of claim 1, in which component (c) has been obtained by photopolymerisation of an acrylate ester containing at least one group of the general formula VII, VIII, or IX

where $R^4$ is a hydrogen, chlorine, or bromine atom, or an alkyl hydrocarbon group of 1 to 4 carbon atoms.

11. The composites of claim 10, in which the acrylate ester which has been photopolymerised is neopentyl glycol diacrylate or is of the formula

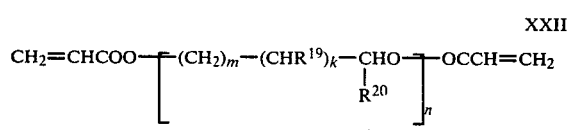

or

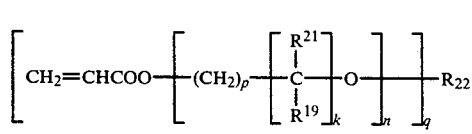

or

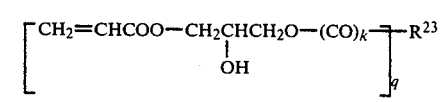

or

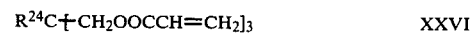

or

where
$R^{19}$ denotes —H, —OH, or —OOCCH=CH$_2$,
$R^{20}$ denotes —H, —CH$_3$, —C$_2$H$_5$, —CH$_2$OH, or —CH$_2$OOCCH=CH$_2$,
$R^{21}$ denotes —H, —Cl, —CH$_3$, or —C$_2$H$_5$,
$R^{22}$ denotes an organic radical of valence q, linked through a carbon atom or carbon atoms thereof to the indicated q terminal oxygen atoms,
$R^{23}$ denotes an organic radical of valence q, linked through a carbon atom thereof, other than the carbon atom of a carbonyl group,
$R^{24}$ denotes CH$_3$—, C$_2$H$_5$—, or CH$_2$=CHCOOCH$_2$—,
$R^{25}$ denotes either an alkyl group of 1 to 6 carbon atoms, an alkyl group of 1 to 6 carbon atoms substituted by one hydroxyl group, or a dialkylaminoalkyl group containing in all 3 to 12 carbon atoms,
k is zero or 1,
m is an integer of 1 to 8,
n is an integer of 1 to 20,
p is zero or a positive integer, provided that k and p are not both zero, and
q is an integer of 1 to 4.

12. The composites of claim 1, in which the component (c) has been photopolymerised by reaction of an excited molecule of the monomer with an unexcited molecule of the monomer.

13. The composites of claim 1, in which the compound which has been photopolymerised to furnish component (c) contains at least two azido, coumarin, stilbene, disubstituted maleimide, pyridinone, chalcone, propenone, or pentadienone groups, or at least two acrylic acid groups which are substituted in their 3-position by groups having carbon-carbon ethylenic unsaturation or aromaticity in conjugation with the ethylenic double bond of the acrylic group.

14. The composites of claim 1, in which the compound which has been photopolymerised to furnish component (c) contains at least two groups of the formula

or

where $R^5$ is a mononuclear or dinuclear aromatic radical of 6 to 12 carbon atoms.

15. The composites of claim 1, in which the compound which has been photopolymerised to furnish component (c) contains at least two groups of the formula

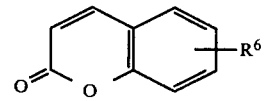

where $R^6$ is an oxygen atom, a carbonyloxy group, a sulfonyl group, or a sulfonyloxy group.

16. The composites of claim 1, in which the compound which has been photopolymerised to furnish component (c) contains at least two groups of the formula

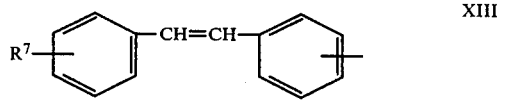

where $R^7$ is the residue, containing up to 8 carbon atoms in all, of a five or six-membered nitrogen-containing heterocyclic ring, fused to a benzene or naphthalene nucleus, and linked through a carbon atom of the said heterocyclic ring adjacent to a nitrogen hetero atom thereof to the indicated benzene nucleus.

17. The composites of claim 1, in which the compound which has been photopolymerised to furnish component (c) contains at least two groups of the formula

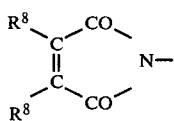

XIV directly attached to carbon atoms, where each $R^8$ is an alkyl group of 1 to 4 carbon atoms, a chlorine atom, or a phenyl group.

18. The composites of claim 1, in which the compound which has been photopolymerised to furnish component (c) contains, directly attached to carbon atoms, at least two groups of the formula

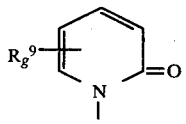

XV where
$R^9$ is an aliphatic or cycloaliphatic radical of 1 to 8 carbon atoms and
g is zero or an integer of 1 to 4.

19. The composites of claim 1, in which the compound which has been photopolymerised to furnish component (c) contains at least two groups of the formula

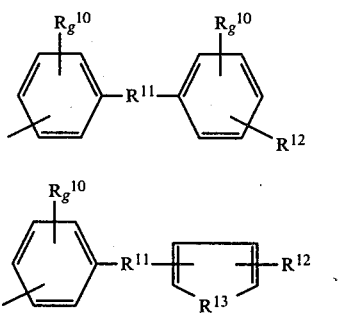

XVI or

XVII where
each $R^{10}$ is a halogen atom, or an alkyl, cycloalkyl, alkenyl, cycloalkenyl, alkoxy, cycloalkoxy, alkenoxy, cycloalkenoxy, carbalkoxy, carbocycloalkoxy, carbalkenoxy, or carbocycloalkenoxy group, such organic groups containing 1 to 9 carbon atoms, or is a nitro group, or a carboxyl, sulfonic, or phosphoric acid group in the form of a salt,
g is zero or an integer of 1 to 4,
$R^{11}$ represents a grouping of formula

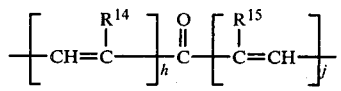

XVIII or

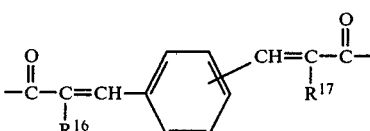

XIX or

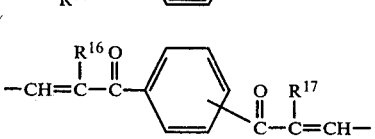

XX wherein
$R^{14}$ and $R^{15}$ are each individually a hydrogen atom, an alkyl group, or an aryl group, or conjointly denote a polymethylene chain of 2 to 4 methylene groups,
$R^{16}$ and $R^{17}$ are each a hydrogen atom, an alkyl group, or an aryl group,
$R^{12}$ represents a valence bond or a hydrogen atom,
h and j are each zero, 1, or 2, with the proviso that they are not both zero, and
$R^{13}$ denotes a sulfur atom or an oxygen atom.

20. The composites of claim 1, in which the compound which has been photopolymerised to furnish component (c) contains at least two groups of the formula $$R^{18}CH=C(R^4)COO— \qquad XXI$$

where
$R^{18}$ is an aliphatic or mononuclear aromatic, araliphatic, or heterocyclyl group which has ethylenic unsaturation or aromaticity in conjugation with the ethylenic double bond shown, and
$R^4$ is a hydrogen, chlorine, or bromine atom, or an alkyl hydrocarbon group of 1 to 4 carbon atoms.

* * * * *